United States Patent [19]

Imagawa

[11] Patent Number: 4,901,345
[45] Date of Patent: Feb. 13, 1990

[54] TELEPHONE SET USABLE AS AN ACOUSTIC COUPLER

[75] Inventor: Yasunori Imagawa, Hamamatsu, Japan

[73] Assignee: Nisser Opto Co., Ltd., Shizuoka, Japan

[21] Appl. No.: 216,427

[22] Filed: Jul. 8, 1988

[30] Foreign Application Priority Data

Jul. 9, 1987 [JP] Japan .............................. 62-105728[U]

[51] Int. Cl.$^4$ ......................................... H04M 11/00
[52] U.S. Cl. .................................... 379/387; 379/444; 379/100
[58] Field of Search ............... 379/387, 391, 396, 443, 379/444, 100, 61, 63, 93

[56] References Cited

U.S. PATENT DOCUMENTS 3,976,840 8/1976 Cleveland et al. .................. 379/444
4,661,659 4/1987 Nishimura ............................ 379/61

FOREIGN PATENT DOCUMENTS 0065648 4/1985 Japan .................................. 379/444
1507246 4/1978 United Kingdom .

Primary Examiner—James L. Dwyer
Attorney, Agent, or Firm—Birch, Stewart Kolasch & Birch

[57] ABSTRACT

A telephone set usable as an acoustic coupler comprising, a transmitter for generating an acoustic signal in response to an electric signal applied thereto, a receiver for generating an electric signal in response to an acoustic signal thereto, a telephone unit for performing telephone communication, a switch for switching over the operation mode of the telephone set, a switching controller connected to the transmitter, receiver and telephone unit for changing the operation mode of the telephone set, in response to the switching state of the switch, display connected to the switching controller for indicating the current operation mode of the telephone set, first connecting terminal connected to the telephone unit for connecting with an external device, second connecting terminal connected to the switching controller for connecting with an external device, and a belt attached to the telephone set for attaching the transmitter and the receiver to a hand set of another telephone set in alignment therewith, the transmitter and the receiver being each swingably provided on a base so that the transmitter and the receiver may contact the hand set of another telephone unit in alignment therewith.

2 Claims, 5 Drawing Sheets

TELEPHONE SET USABLE AS AN ACOUSTIC COUPLER

BACKGROUND OF THE INVENTION

1. Field of the Invention

This invention relates to a telephone set usable as an acoustic coupler, comprising an acoustic coupler for facsimile communication, etc. and a telephone unit for telephone communication, which are made integral.

2. Related Background art

The conventional acoustic coupler is connected to, for example, a facsimile machine etc. and is used as a signal transmitter of a facsimile picture signal by being placed in contact with the handset of an ordinary telephone set for facsimile communication.

In a fixed type facsimile machine in which the acoustic coupler is not used, a telephone line is directly connected to the fixed type facsimile machine and therefore, it is necessary to provide a telephone set for calling another facsimile machine to be communicated with.

Accordingly, when a portable type facsimile machine is used as the fixed type facsimile machine, the user must provide not only an acoustic coupler but also a telephone set connected to a telephone line. However, there is no machine having both an acoustic coupler function and telephone function, and therefore, the user must always prepare both an acoustic coupler and a telephone set.

SUMMARY OF THE INVENTION

It is one object of the present invention to provide a novel telephone set usable as an acoustic coupler, which has both an acoustic coupler function and a telephone function.

It is another object of the present invention to provide a telephone set usable as an acoustic coupler, comprising a transmitter for generating an acoustic signal in response to an electric signal applied thereto, a receiver for generating an electric signal in response to an acoustic signal thereto, a telephone unit for performing telephone communication; switching means for switching over the operation mode of said telephone set, a switching controller connected to said transmitter, receiver and telephone unit for changing the operation mode of said telephone set, in response to the switching state of said switching means display means connected to said switching controller for indicating the current operation mode of the telephone set, first connecting means connected to said telephone unit for connecting with an external device; second connecting means connected to said switching controller for connecting with an external device; and a belt attached to said telephone set for contacting the transmitter and the receiver to hand set of another telephone set in alignment therewith, the transmitter and the receiver being swingably provided on a base so that the transmitter and the receiver may contact the hand set of another telephone unit in alignment therewith.

DETAILED DESCRIPTION OF THE INVENTION

An embodiment according to the present invention is explained below with reference to the drawings attached hereto.

Figure 1A:
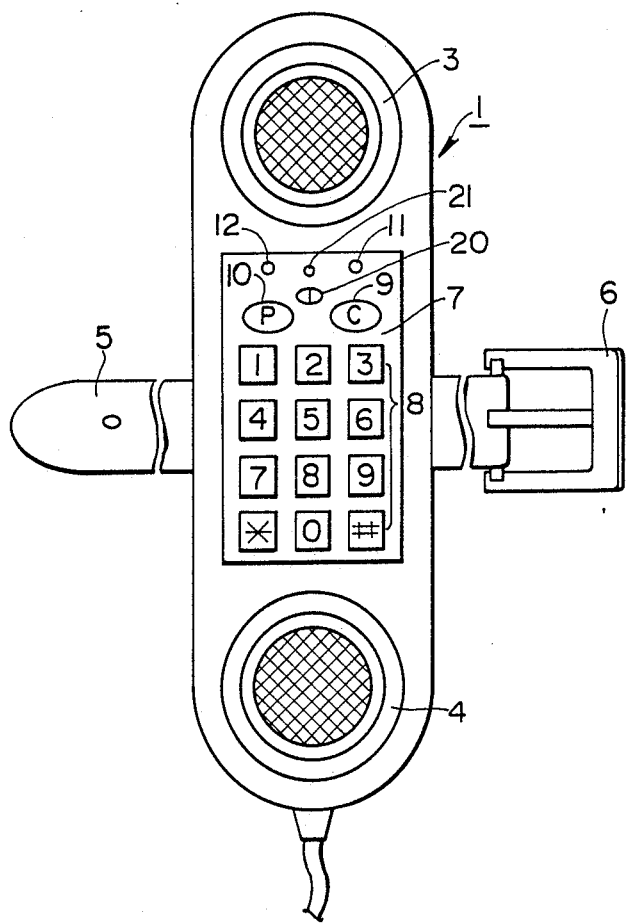
FIG. 1A is a front view of the telephone set usable as an acoustic coupler according to the present invention.
Figure 1B:
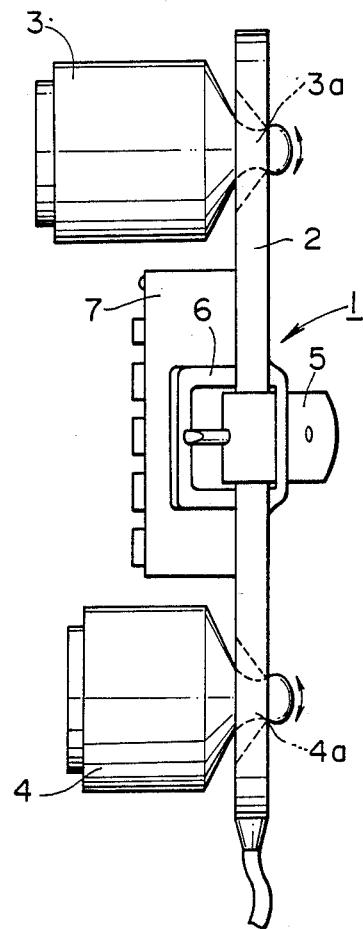
FIG. 1B is a side view of the telephone set usable as an acoustic coupler according to the present invention.

FIG. 1A is a front view of one embodiment of a telephone set usable as an acoustic coupler according to the present invention, and FIG. 1B is a side view of one embodiment of a telephone set usable as an acoustic coupler according to the present invention.

A transmitter 3 is provided on the upper portion of a base 2, which has the shape of an elongate flat plate, and a receiver 4 is provided on the lower portion thereof. The transmitter 3 and the receiver 4 constitute an acoustic coupler for facsimile communication. In facsimile communication, the base 2 is placed in contact with the handset of an ordinary telephone set so that the transmitter 3 and the receiver 4 as the acoustic coupler may contact a microphone and a speaker of the ordinary telephone set (not shown) in alignment therewith respectively.

It is necessary that the base can be placed in contact with the handsets of various type telephone sets in a manner providing proper alignment. To this end, the transmitter 3 and the receiver 4 are provided on the base 2 so that they are swingable with respect thereto. In this embodiment, the shaft portion 3a of the transmitter 3 and the shaft portion 4a of the receiver 4, which portions are passing through the base 2, are tapered to be loosely inserted in the base 2, so that the transmitter 3 and the receiver 4 are swingable in the range of 360 degrees therearound. A belt 5 having a buckle 6 is attached to the base 2. When the transmitter 3 and the receiver 4 are placed in contact with the handset of the ordinary telephone set, the belt is put over the handset and tightened. This keeps the transmitter 3 and the receiver 4 in tight contact to the handset of the telephone set, and the acoustic communication between the two is secured.

There is provided a function unit 7 on the base between the transmitter 3 and the receiver 4. The function unit 7 houses a print wiring board (not shown). On the front surface of the function unit 7, dialing push buttons 8, an acoustic coupler switch 9, a telephone switch 10 and a hooking switch 20 for changing the state of a telephone unit (shown in FIG. 3) into either one of an on hook or off hook state are provided. The switches 9, 10 are operated to cause the telephone set to be usable as an acoustic coupler of the present invention to function as an acoustic coupler or a telephone set.

When the telephone set usable as an acoustic coupler functions as a telephone set, the transmitter 3 is used as the speaker of the handset of the ordinary telephone set, while the receiver 4 is used as the microphone of the handset of the telephone set. Thus, very conveniently the telephone set usable as an acoustic coupler of the present invention is usable selectively as an acoustic coupler or a telephone set.

In FIGS. 1A and 1B, reference numerals 11, 12 represent lamps made of light emitting diode which turn on or off to indicate a used mode of the acoustic coupler or the telephone and reference numeral 21 represents a lamp indicating an on hook or off hook state of the telephone unit.

FIG. 3 shows a block diagram of a circuit provided in the telephone set usable as an acoustic coupler.

Figure 2:
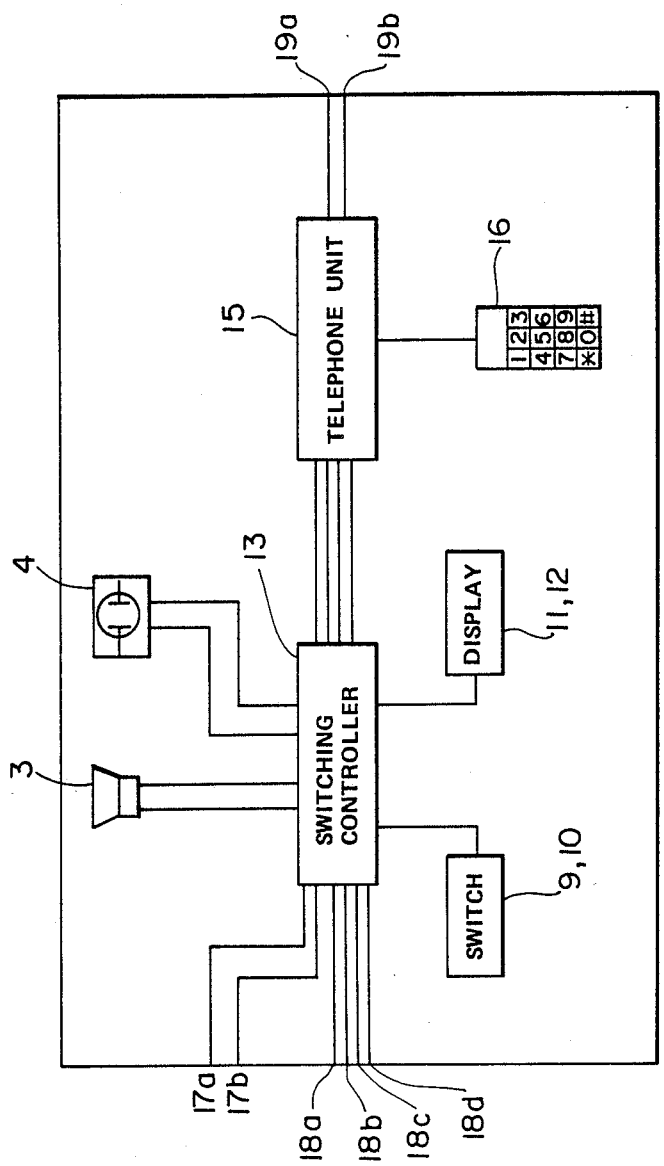
FIG. 2 shows a block diagram of a circuit provided in the telephone set shown in FIGS. 1A and 1B.

The telephone set usable as an acoustic coupler, as shown in FIG. 2, has connection terminals 17a, 17b, 18a, 18b, 18c, 18d, 19a, and 19b which are used for connecting to an external machine, for example, a facsimile machine.

The connection terminals comprise a power supply terminal 17a, a ground terminal 17b, acoustic coupler terminals 18a, 18b, 18c, 18d, and telephone terminals 19a, 19b.

Further, the telephone set 1 usable as an acoustic coupler has a switching controller 13 for switching an operation mode of the telephone set 1. The telephone set 1 has a receiver 4 for converting a received acoustic signal into an electric signal to transmit the electric signal to the switching controller 13, and a transmitter 3 for converting a signal transmitted from the switching controller 13 into an acoustic signal. The switching controller 13 is connected to switches 9,10 for switching the operation mode of the telephone set 1 and displays 11,12 for indicating the current operation mode of the telephone set 1.

Further, a telephone unit 15 is connected to the switching controller 13 and the telephone unit 15 is connected to a push phone dialing keyboard 16 for generating a dialing signal. The telephone unit 15 has an anti sidetone circuit to arrange the electric signal from the receiver 4 and to the transmitter 3 to be a signal suitable for a public telephone line.

The switching controller 13 has two modes, one mode wherein the receiver 4 and transmitter 3 are electrically connected to the acoustic coupler terminals 18a, 18b, 18c, 18d, and another mode wherein the receiver 4 and transmitter 3 and electrically connected to the telephone unit 15. Further, the switching controller 13 controls the display 11, 12 for indicating the current operation mode of the telephone set 1, in response to the operation of the switches 9 or 10 to cause them to indicate the current state of the telephone set 1.

When the switch 9 is turned on, the switching controller 13 is changed into an acoustic coupler mode so that the telephone set 1 functions as an acoustic coupler. The switching controller 13 turns on the display 11. In the acoustic coupler mode, the receiver 4 and the transmitter 3 are electrically connected to the acoustic coupler terminals 18a, 18b, 18c, 18d. In the use of the telephone set 1, the receiver 4 is in contact with a microphone of the ordinary telephone set and the transmitter 3 is in contact with a speaker of the ordinary telephone set. An acoustic signal received at the receiver 4 from the speaker of the ordinary telephone set is converted into an electric signal to be transmitted to the acoustic coupler terminals 18a, 18b. An electric signal inputted through the acoustic coupler terminal 18c, 18d is transmitted to the transmitter 3 to be converted into an acoustic signal so that the acoustic signal is transmitted to the microphone of the ordinary telephone set.

When the switch 10 is turned on, the switching controller 13 is changed into the telephone mode so that the telephone set 1 functions as an ordinary telephone set. And the switching controller 13 turns off the display 11 and turns on the display 12. In this state, the receiver 4 and transmitter 3 are electrically connected to the telephone unit 15 and further connected to the telephone terminals 19a,19b through the telephone unit 15. In this condition, the receiver 4 and the transmitter 3 respectively function the microphone of the ordinary telephone set. Further, a dialing signal generated by pushing buttons provided on the key board 16, which is connected to the telephone unit 15, is transmitted to an external line through the telephone unit 16 and the telephone terminal 19a, 19b to perform the dialing operation of the telephone set 1.

Next one example in the use of the above telephone set usable as an acoustic coupler described above will be explained referring to FIGS. 3A and 3B.

Figure 3A:
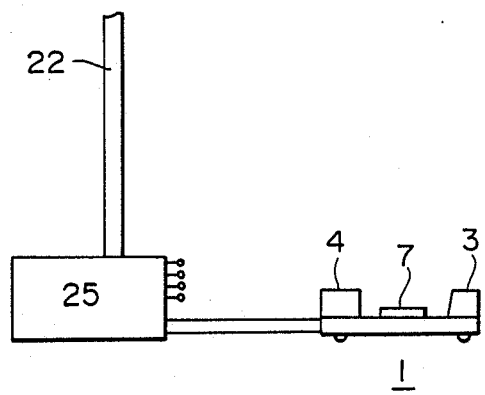
FIG. 3A is a view showing an example of the application of the telephone set according to the present invention to a fixed type facsimile machine which is directly connected to a public telephone line.

FIG. 3A shows an example of the application of the telephone set 1 to a facsimile machine 25 which is used as a fixed type facsimile machine. The telephone terminal 19a, 19b of the telephone set 1 is, as shown in FIG. 3A, connected to terminals of the facsimile machine 25 to which an ordinary telephone set is usually connected and the public telephone line 22 is connected to the facsimile machine 25 therethrough. Thus, the dialing for designating another facsimile machine to be communicated is performed by the telephone set 1.

Figure 3B:
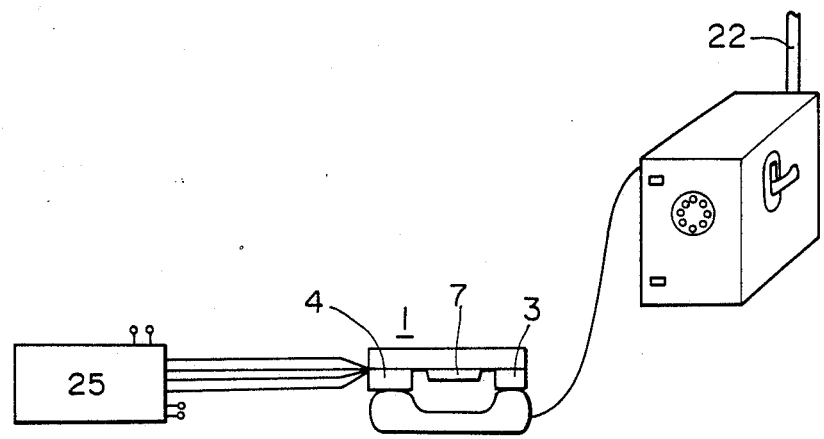
FIG. 3B is a view showing an example of the application of the telephone set according to the present invention to a facsimile machine in the case that the public telephone line cannot be directly connected to the facsimile machine.

Next, when the facsimile machine 25 is used in a place where a public telephone line cannot be directly connected to the facsimile machine, for example, where the facsimile communication is performed by using a pay station telephone or a private telephone set, the acoustic coupler terminals 18a, 18b, 18c, 18d of the telephone set 1 are connected to the terminal for an acoustic coupler in the facsimile machine 20, and the receiver 4 and the transmitter 3 are, as shown in FIG. 3B, placed in contact with the hand set of the pay station or the private telephone set. In this case, the dialing for designating the facsimile machine to be communicated with is performed by the pay station telephone set or the private telephone set.

As described above, facsimile communication can be performed at any location by the combination of the telephone set usable as an acoustic coupler according to the present invention and a portable facsimile machine.

Next, examples of the application of the telephone set usable as an acoustic coupler described above will be explained in comparison with the prior art, referring to FIGS. 4A, 4B, 5A and 5B.

Figure 4A:
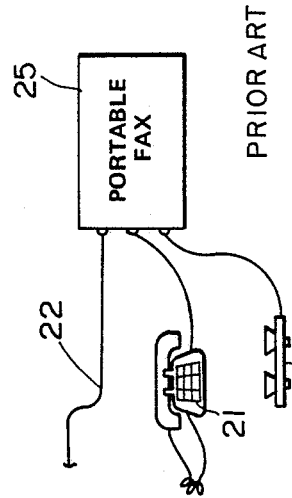
FIG. 4A shows the prior art showing an example of the application of an ordinary telephone set to a fixed type facsimile machine.
Figure 4B:
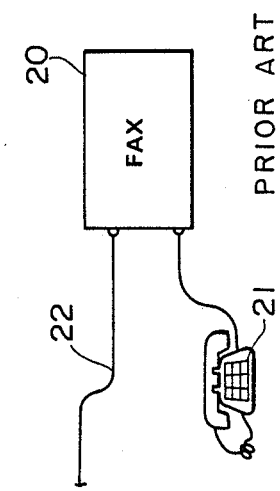
FIG. 4B shows an example of the application of the telephone set according to the present invention to a fixed type facsimile machine.

FIGS. 4A and 4B show examples of the application to the desk facsimile machine 20. As shown in FIG. 4B, the telephone set 1 usable as an acoustic coupler is connected to a desk facsimile 20. In the prior art, it is usual to connect a telephone set 21 to the desk facsimile machine 20. In the present invention, however, the telephone set 21 is replaced with the telephone set 1 usable as an acoustic coupler. Besides, in the prior art, it is essential to connect a telephone circuit 22 to the facsimile machine 20, but it is not essential to the telephone set usable as an acoustic coupler. In the present invention, for the facsimile communication, using the telephone circuit of another telephone set 23, the handset 24 of the telephone set 23 is placed in contact with the transmitter 3 and the receiver 4.

Figure 5A:
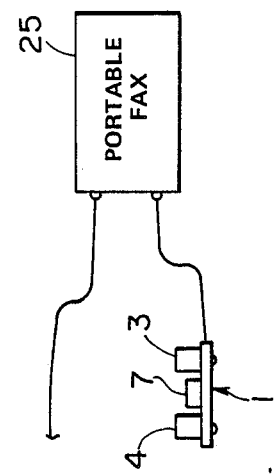
FIG. 5A shows the prior art showing an example of the application of an ordinary telephone set and a ordinary acoustic coupler to a portable type facsimile machine.
Figure 5B:
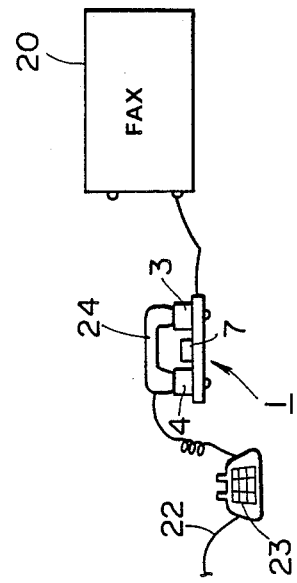
FIG. 5B shows an example of the application of the telephone set according to the present invention to a portable type facsimile machine.

FIGS. 5A and 5B show examples of the use of a portable facsimile machine. As shown in FIG. 5A, in the prior art it is usual to connect an acoustic coupler 26 and the telephone set 21 to the portable facsimile machine. In the present invention, however, as shown in FIG. 5B, the acoustic coupler 26 and the telephone set 21 can be replaced with the telephone set 1 usable as an acoustic coupler.

As described above in detail, the telephone set according to the present invention has the functions of an acoustic coupler and a telephone set. This makes it possible to dispense with the usual telephone unit. Result advantages obtained from the present invention are that the facsimile machine can be made simple and can be made easy to use.

What is claimed:

1. A telephone set usable as an acoustic coupler comprising:
    a base plate;
    a telephone transmitter swingably attached to said base plate, for generating an acoustic signal in response to an electric signal applied thereto;
    a telephone receiver swingably attached to said base plate, for generating an electric signal in response to an acoustic signal applied thereto;
    a belt attached to said base plate, for coupling said telephone transmitter and said telephone receiver with those of a hand set of another telephone set in alignment therewith;
    a telephone unit means attached to said base plate, for dialing another telephone set;
    switching means for switching between a telephone mode and an acoustic coupler mode of said telephone set;
    a switching controller means attached to said base plate and electrically connected to said telephone transmitter, said telephone receiver and said switching means, for controlling the operation mode of said telephone set in response to the operation of said switching means;
    display means electrically connected with said switching controller means, for indicating the current operation mode of said telephone set;
    first connecting means electrically connected with said telephone unit means, for electrically connecting with a public telephone line;
    second connecting means electrically connected with said switching controller means, for electrically connecting with an external device, and
    said telephone transmitter and said telephone receiver being electrically connected with said first connecting means through said telephone unit means, when said telephone set is in the telephone mode, and said telephone transmitter and said telephone receiver being electrically connected with said second connecting means when said telephone set is in the acoustic coupler mode.

2. A telephone set usable as an acoustic coupler according to claim 1, wherein the external device is a facsimile machine.

* * * * *